(12) United States Patent
Hsiao et al.

(10) Patent No.: US 12,663,892 B1
(45) Date of Patent: Jun. 23, 2026

(54) PIXEL CIRCUIT

(71) Applicant: AUO Corporation, Hsinchu City (TW)

(72) Inventors: Yu-Chi Hsiao, Hsinchu City (TW);
Wen-Chiuan Su, Hsinchu City (TW);
Ling-Ying Chien, Hsinchu City (TW);
Tsu-Yuan Lin, Hsinchu City (TW);
Hung Chi Chen, Hsinchu City (TW);
Kuang-Hsiang Liu, Hsinchu City (TW)

(73) Assignee: AUO Corporation, Hsinchu City (TW)

( * ) Notice: Subject to any disclaimer, the term of this
patent is extended or adjusted under 35
U.S.C. 154(b) by 0 days.

(21) Appl. No.: 19/232,876

(22) Filed: Jun. 10, 2025

(30) Foreign Application Priority Data

Dec. 19, 2024 (TW) ................................. 113149700

(51) Int. Cl.
*G06F 3/041* (2006.01)
*G09G 3/14* (2006.01)
(52) U.S. Cl.
CPC .............. *G06F 3/0416* (2013.01); *G09G 3/14*
(2013.01)
(58) Field of Classification Search
CPC ......... G09G 3/3233; G09G 2300/0819; G09G
2310/08; G09G 2300/0426
See application file for complete search history.

(56) References Cited

U.S. PATENT DOCUMENTS

| | | | | |
|---|---|---|---|---|
| 2003/0067434 A1* | 4/2003 | Haga | ................... | G09G 3/3648 |
| | | | | 345/98 |
| 2021/0118367 A1* | 4/2021 | Chen | ................... | G09G 3/3258 |
| 2021/0375702 A1* | 12/2021 | Xiao | ................... | H10D 86/441 |
| 2022/0102583 A1* | 3/2022 | Baumheinrich | ....... | G02B 6/105 |
| 2022/0157247 A1* | 5/2022 | Yue | ...................... | G09G 3/3233 |
| 2022/0320229 A1* | 10/2022 | Du | ......................... | G09G 3/006 |
| 2022/0415998 A1* | 12/2022 | Liu | ...................... | G09G 3/3266 |
| 2023/0126436 A1* | 4/2023 | Bai | ...................... | G09G 3/3266 |
| | | | | 345/204 |
| 2024/0412688 A1* | 12/2024 | Gao | ......................... | G09G 3/32 |

* cited by examiner

*Primary Examiner* — Van N Chow
(74) *Attorney, Agent, or Firm* — JCIPRNET

(57) ABSTRACT

A pixel circuit includes a first connection point, a second
connection point, a first transistor, a second transistor, a third
transistor, a fourth transistor, a fifth transistor, a sixth tran-
sistor, a seventh transistor, an eighth transistor, a ninth
transistor, and a first capacitor. A first control signal, a
second control signal, an emission control signal, a system
high voltage, a system low voltage, a first reference voltage,
and a second reference voltage received by the first transis-
tor, the second transistor, the third transistor, the fourth
transistor, the fifth transistor, the sixth transistor, the seventh
transistor, the eighth transistor, and the ninth transistor are
set to electrically test the first connection point, the second
connection point, the first transistor, the second transistor,
the third transistor, the fifth transistor, the sixth transistor, the
seventh transistor, and the first capacitor.

15 Claims, 5 Drawing Sheets

100

PIXEL CIRCUIT

CROSS-REFERENCE TO RELATED APPLICATION

This application claims the priority benefit of Taiwan application serial no. 113149700, filed on Dec. 19, 2024. The entirety of the above-mentioned patent application is hereby incorporated by reference herein and made a part of this specification.

BACKGROUND

Technical Field

The disclosure relates to a pixel circuit, and in particular to a pixel circuit for configuring light emitting diodes.

Description of Related Art

After the array manufacturing stage is completed, the performance of the transistor on the display panel is tested to detect defects caused by the manufacturing process. The electrical test is called "array test", in which one of the detection methods of the array test is to measure the current flowing through the data lines. Therefore, how to perform circuit detection of the pixel circuit through the data lines has become a focus of array testing.

SUMMARY

The disclosure provides a pixel circuit that can test the transistor and the connection points in the pixel circuit when the light emitting diode is not configured, thereby it is not necessary to increase the signals required by the panel. That is, the circuit area of the gate driver circuit region is not increased, and the normal operation of the transistors in the pixel circuit is not affected.

The pixel circuit of the disclosure includes a first connection point, a second connection point, a first transistor, a second transistor, a third transistor, a fourth transistor, a fifth transistor, a sixth transistor, a seventh transistor, an eighth transistor, a ninth transistor, and a first capacitor. The first connection point is used to connect the anode of a light emitting element. The second connection point is used to connect the cathode of the light emitting element and is coupled to a system low voltage. The first transistor has a first terminal, a control terminal, and a second terminal receiving a system high voltage. The second transistor has a first terminal, a control terminal receiving a first control signal, and a second terminal coupled to the second terminal of the first transistor. The third transistor has a first terminal coupled to the control terminal of the first transistor, a control terminal receiving the first control signal, and a second terminal coupled to the first terminal of the second transistor. The fourth transistor has a first terminal coupled to the first terminal of the second transistor, a control terminal receiving the second control signal, and a second terminal receiving a first reference voltage. The fifth transistor has a first terminal providing a data signal, a control terminal receiving a first control signal, and a second terminal. The sixth transistor has a first terminal coupled to the second terminal of the fifth transistor, a control terminal receiving an emission control signal, and a second terminal receiving a first reference voltage. The first capacitor is coupled between the second terminal of the fifth transistor and the control terminal of the first transistor. The seventh transistor has a first terminal coupled to the second terminal of the first transistor, a control terminal receiving the emission control signal, and a second terminal coupled to the first connection point. The eighth transistor has a first terminal coupled to the first connection point, a control terminal receiving the emission control signal, and a second terminal. The ninth transistor has a first terminal coupled to the second terminal of the eighth transistor, a control terminal receiving the second reference voltage, and a second terminal coupled to the first terminal of the fifth transistor. The first control signal, the second control signal, the emission control signal, the system high voltage, the system low voltage, the first reference voltage, and the second reference voltage are set to electrically test the first connection point, the second connection point, the first transistor, the second transistor, the third transistor, the fifth transistor, the sixth transistor, the seventh transistor, and the first capacitor.

Based on the above, compared with the conventional pixel circuit, when the light emitting element is not configured, the pixel circuit may be electrically divided, and by setting the control signal, the emission control signal, the system high voltage, the system low voltage, the first reference voltage, and the second reference voltage, the test result may be reflected from the data signal in sequence. In this way, when it is necessary to increase the signals required by the panel, the transistors, the capacitor, and the connection points may be tested in groups. That is, the circuit area of the gate driver circuit region on the panel is not increased, and the normal operation of the transistor in the pixel circuit is not affected.

In order to make the above-mentioned features and advantages of the disclosure more comprehensible, embodiments are given below and described in detail with reference to the accompanying drawings.

DESCRIPTION OF THE EMBODIMENTS

Unless otherwise defined, all terms (including technical and scientific terms) used herein have the same meaning as commonly understood by persons of ordinary skill in the art to which the disclosure belongs. It will be further understood that terms such as those defined in commonly used dictionaries should be construed to have meanings consistent with their meanings in the context of the relevant technology and the disclosure, and should not be interpreted as idealized or overly formal meanings, unless explicitly defined as such herein.

It will be understood that, although the terms such as "first", "second", "third" may be used herein to describe various elements, components, regions, layers, and/or sections, these elements, components, regions, layers, and/or sections should not be limited. These terms are merely used to distinguish one element, component, region, layer, or section from another element, component, region, layer, or section. Thus, a "first element", "component", "region", "layer" or "section" discussed below could be termed a second element, component, region, layer, or section without departing from the teachings herein.

The terminology used herein is merely for the purpose of describing particular embodiments and is not intended to be limiting. As used herein, the singular forms "a", "an" and "the" are intended to include the plural forms including "at least one", "or", "and/or" unless the context clearly indicates otherwise. As used herein, the term "and/or" includes any and all combinations of one or more of the associated listed items. It will also be understood that when used in this specification, the terms "comprises" and/or "includes" designate the presence of recited features, regions, entity, steps, operations, elements, and/or components. However, this does not exclude the presence or addition of one or more other features, regions, entity, steps, operations, elements, components, and/or combinations thereof.

Figure 1:
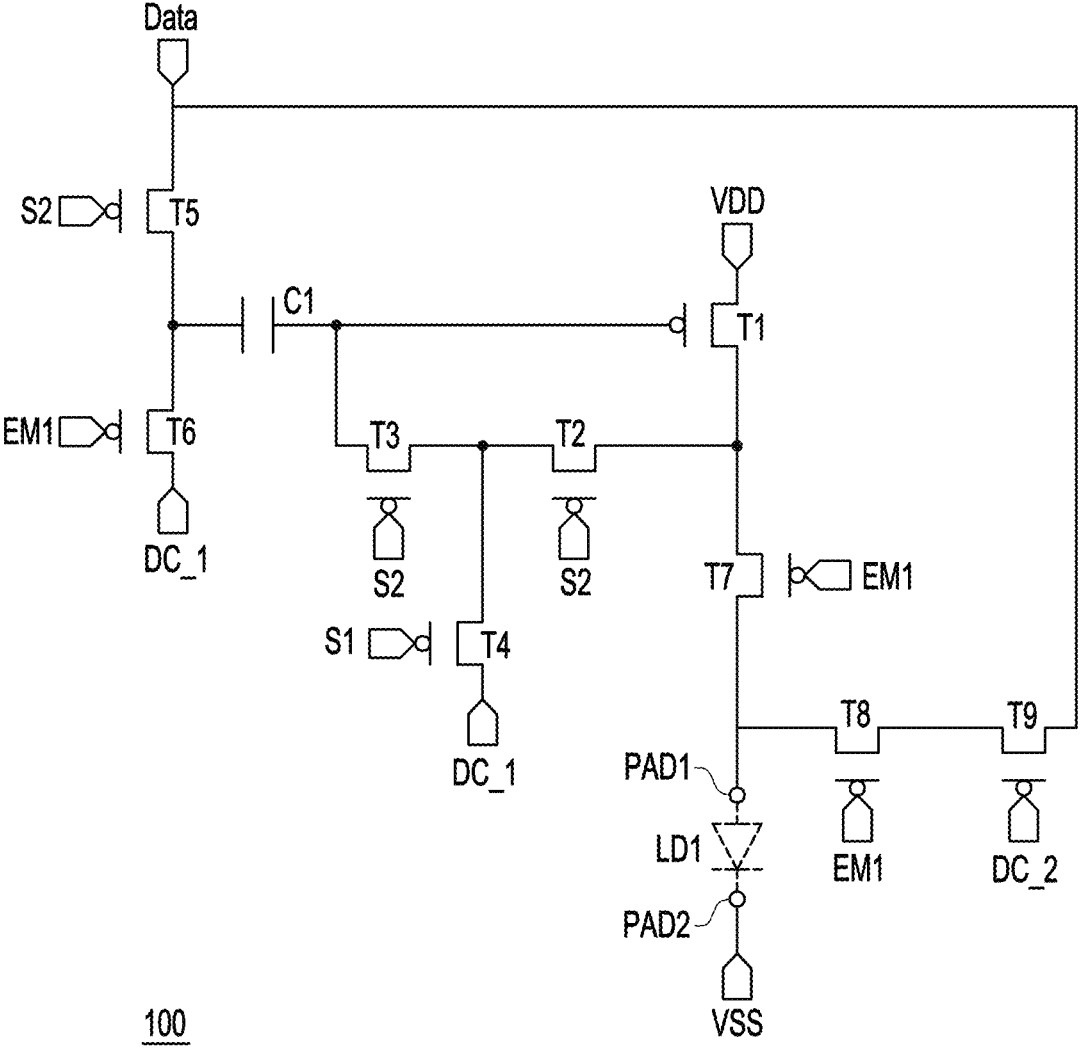
FIG. 1 is a system schematic diagram of a pixel circuit according to an embodiment of the disclosure.

FIG. 1 is a system schematic diagram of a pixel circuit according to an embodiment of the disclosure. Referring to FIG. 1, in this embodiment, a pixel circuit 100 includes, for example, connection points PAD1 and PAD2 (corresponding to a first connection point and a second connection point), transistors T1 to T9 (corresponding to a first transistor to a ninth transistor), and a capacitor C1 (corresponding to a first capacitor). As an example, the respective transistors T1 to T9 are P-type transistors, but the embodiments of the disclosure are not limited thereto.

The connection point PAD1 is used to connect the anode of a light emitting element (such as a micro light emitting diode LD1). The connection point PAD2 is used to connect the cathode of the micro light emitting diode LD1, and is coupled to a system low voltage VSS. The transistor T1 has a first terminal receiving a system high voltage VDD, a control terminal, and a second terminal. The transistor T2 has a first terminal, a control terminal receiving a control signal S2 (corresponding to a first control signal), and a second terminal coupled to the second terminal of the transistor T1.

The transistor T3 has a first terminal coupled to the control terminal of the transistor T1, a control terminal receiving the control signal S2, and a second terminal coupled to the first terminal of the transistor T2. The transistor T4 has a first terminal coupled to the first terminal of the transistor T2, a control terminal receiving the control signal S1 (corresponding to a second control signal), and a second terminal receiving a first reference voltage DC_1. The transistor T5 has a first terminal providing a data signal Data, a control terminal receiving the control signal S2, and a second terminal. The transistor T6 has a first terminal coupled to the second terminal of the transistor T5, a control terminal receiving an emission control signal EM1, and a second terminal receiving the first reference voltage DC_1.

The capacitor C1 is coupled between the second terminal of the transistor T5 and the control terminal of the transistor T1. The transistor T7 has a first terminal coupled to the second terminal of the transistor T1, a control terminal receiving the emission control signal EM1, and a second terminal coupled to the connection point PAD1. The transistor T8 has a first terminal coupled to the connection point PAD1, a control terminal receiving the emission control signal EM1, and a second terminal. The transistor T9 has a first terminal coupled to the second terminal of the transistor T8, a control terminal receiving a second reference voltage DC_2, and a second terminal coupled to the first terminal of the fifth transistor T5.

In this embodiment, the control signals S1 and S2, the emission control signal EM1, the system high voltage VDD, the system low voltage VSS, the first reference voltage DC_1, and the second reference voltage DC_2 are set to electrically test the connection points PAD1, PAD2, the transistors T1 to T3, T5 to T7, and the capacitor C1 in partitions (or in groups) in a time-division manner, and the test result may be read out from the data signal Data in sequence (that is, the test result may be read out from the current of the data line).

Based on the above, compared with the conventional pixel circuit, when the micro light emitting diode LD1 is not configured, the pixel circuit 100 may be divided into several different signal paths, and by setting the control signals S1 and S2, the emission control signal EM1, the system high voltage VDD, the system low voltage VSS, the first reference voltage DC_1, and the second reference voltage DC_2, the test result may be reflected from the data signal Data in sequence. In this embodiment, in order to measure the electrical properties of the transistor T1 (that is, a drive transistor) on the right side of the capacitor C1 (that is, the storage capacitor), the transistors T8 and T9 are added to the connection point PAD1 to connect to the data line, in which the transistor T8 and the transistor T7 share the emission control signal EM1, and the transistor T9 is controlled by a direct current (DC) signal (that is, the second reference voltage DC_2), thereby the transistor T1 may be tested while it is not necessary to increase the signals required by the panel. That is, the circuit area of the gate driver circuit region on the panel is not increased, and the normal operation of the transistors in the pixel circuit is not affected.

In an embodiment of the disclosure, the connection points PAD1 and PAD2 are, for example, the endpoints of the wiring, through-holes, or solder joints, but the embodiments of the disclosure are not limited thereto.

Figures 2A, 2B:
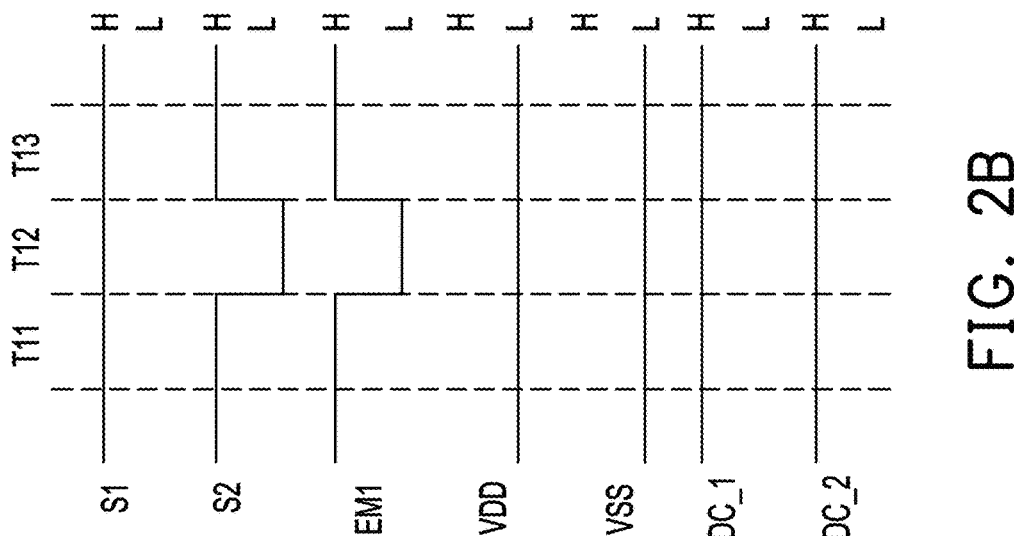
FIG. 2A is a circuit operation schematic diagram of a first test operation of the pixel circuit according to an embodiment of the disclosure.
FIG. 2B is a timing diagram of the first test operation of the pixel circuit according to an embodiment of the disclosure.

FIG. 2A is a circuit operation schematic diagram of a first test operation of the pixel circuit according to an embodiment of the disclosure. FIG. 2B is a timing diagram of the first test operation of the pixel circuit according to an embodiment of the disclosure. Referring to FIG. 1, FIG. 2A, and FIG. 2B, in this embodiment, three time periods are roughly divided, namely, a time period T11 before the test, a time period T12 during the test, and a time period T13 after the test.

In the time period T11, the control signal S1, the control signal S2, the emission control signal EM1, the first reference voltage DC_1, and the second reference voltage DC_2 are at a high voltage level H, and the system high voltage VDD and the system low voltage VSS are at a low voltage level L. At this time, the transistors T2 to T9 are in an off state, and the transistor T1 is turned off in response to the low voltage level L of the system high voltage VDD. In this time period, the data signal Data is basically independent of the state of the pixel circuit 100.

In the time period T12, the control signal S1, the first reference voltage DC_1, and the second reference voltage DC_2 are at the high voltage level H, and the control signal S2, the emission control signal EM1, the system high voltage VDD, and the system low voltage VSS are at the low voltage level L. At this time, the transistors T2, T3, and T5 to T8 are in an on state, the transistors T4 and T9 are in the off state, and the transistor T1 is turned off in response to the low voltage level L of the system high voltage VDD, in which the transistors T5 and T6 form an input path PH1. Due to the transistors T1 and T9 being off, the data signal Data is basically related to the state of the transistors T5 and T6. That is, the data signal Data reflects the test result of the input path PH1. The actions in the time period T13 are basically the same as the time period T11.

Figures 3A, 3B:
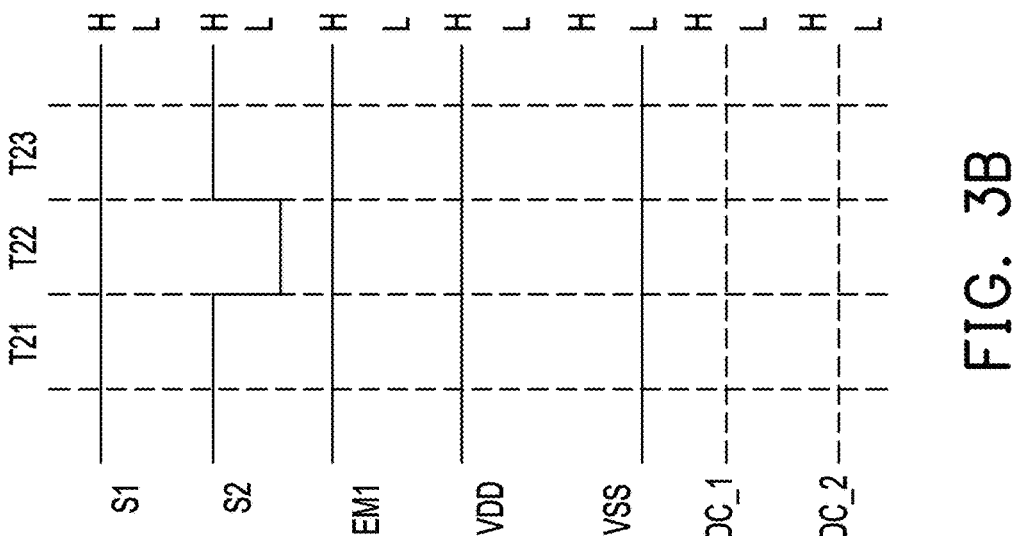
FIG. 3A is a circuit operation schematic diagram of a second test operation of the pixel circuit according to an embodiment of the disclosure.
FIG. 3B is a timing diagram of the second test operation of the pixel circuit according to an embodiment of the disclosure.

FIG. 3A is a circuit operation schematic diagram of a second test operation of the pixel circuit according to an embodiment of the disclosure. FIG. 3B is a timing diagram of the second test operation of the pixel circuit according to an embodiment of the disclosure. Referring to FIG. 1, FIG. 3A, and FIG. 3B, in this embodiment, three time periods are roughly divided, namely, a time period T21 before the test, a time period T22 during the test, and a time period T23 after the test.

In the time period T21, the control signal S1, the control signal S2, the emission control signal EM1, and the system high voltage VDD are at the high voltage level H, the system low voltage VSS is at the low voltage level L, and the first reference voltage DC_1 and the second reference voltage DC_2 may be at any voltage level (such as the high voltage level H or the low voltage level L). At this time, the transistors T2 to T8 are in the off state, and the data signal Data is basically independent of the state of the pixel circuit 100.

In the time period T22, the control signal S1, the emission control signal EM1, and the system high voltage VDD are at the high voltage level H, the control signal S2 and the system low voltage VSS are at the low voltage level L, and the first reference voltage DC_1 and the second reference voltage DC_2 may be at any voltage level. At this time, the transistors T2, T3, and T5 are in the on state, the transistors T4, T6, T7, and T8 are in the off state, and the transistor T1 is turned on in response to the high voltage level H of the system high voltage VDD, in which the transistors T1, T2, T3, T5 and the capacitor C1 form a transistor compensation path PH2, and the transistor T9 may be on or off. Due to the transistors T4, T6, T7, and T8 being off, the data signal Data is basically related to the state of the transistors T1, T2, T3, T5 and the capacitor C1. That is, the data signal Data reflects the test result of the transistor compensation path PH2. At this time, the data signal Data may indicate whether the capacitor C1 (that is, the storage capacitor) is open or shorted. The actions in the time period T23 are basically the same as the time period T21.

Figures 4A, 4B:
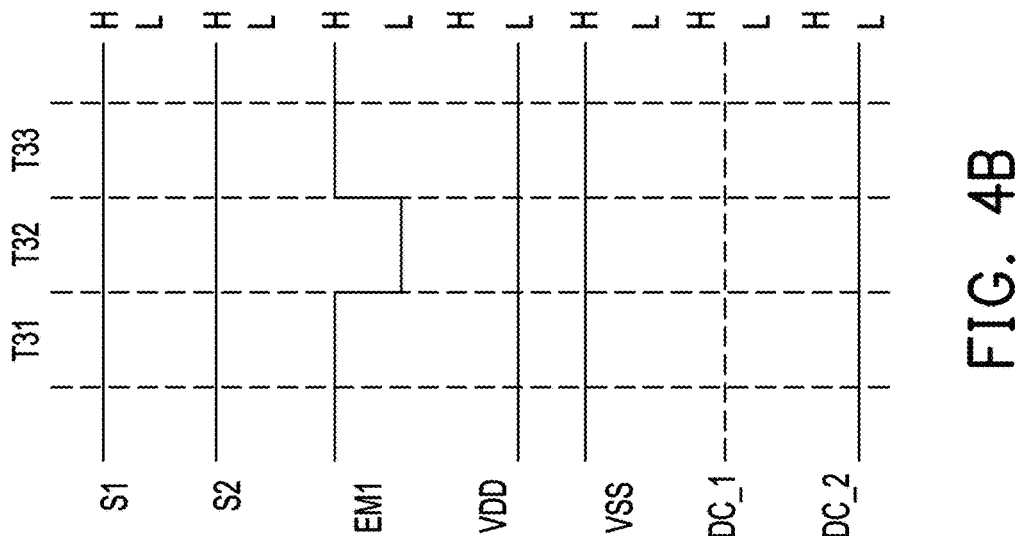
FIG. 4A is a circuit operation schematic diagram of a third test operation of the pixel circuit according to an embodiment of the disclosure.
FIG. 4B is a timing diagram of the third test operation of the pixel circuit according to an embodiment of the disclosure.

FIG. 4A is a circuit operation schematic diagram of a third test operation of the pixel circuit according to an embodiment of the disclosure. FIG. 4B is a timing diagram of the third test operation of the pixel circuit according to an embodiment of the disclosure. Referring to FIG. 1, FIG. 4A, and FIG. 4B, in this embodiment, three time periods are roughly divided, namely, a time period T31 before the test, a time period T32 during the test, and a time period T33 after the test.

In the time period T31, the control signals S1, S2, the emission control signal EM1, and the system low voltage VSS are at the high voltage level H, the system high voltage VDD and the second reference voltage DC_2 are at the low voltage level L, the transistor T1 is turned off in response to the low voltage level L of the system high voltage VDD, and the first reference voltage DC_1 may be at any voltage level (such as the high voltage level H or the low voltage level L). At this time, the transistors T1 to T8 are in the off state, and the data signal Data is basically independent of the state of the pixel circuit 100.

In the time period T32, the control signals S1, S2 and the system low voltage VSS are at the high voltage level H, the emission control signal EM1, the system high voltage VDD, and the second reference voltage DC_2 are at the low voltage level L, and the transistor T1 is turned off in response to the low voltage level L of the system high voltage VDD. At this time, the transistors T6 to T9 are in the on state, the transistors T2 to T5 are in the off state, and the transistor T1 is turned off in response to the low voltage level L of the system high voltage VDD, in which the connection points PAD1 and PAD2 form a contact test path PH3. Due to the transistors T1 and T5 being off, the data signal Data reflects the test result of the contact test path PH3. At this time, the data signal Data may indicate whether the connection points PAD1 and PAD2 are open or shorted. The actions in the time period T33 are basically the same as the time period T31.

Figures 5A, 5B:
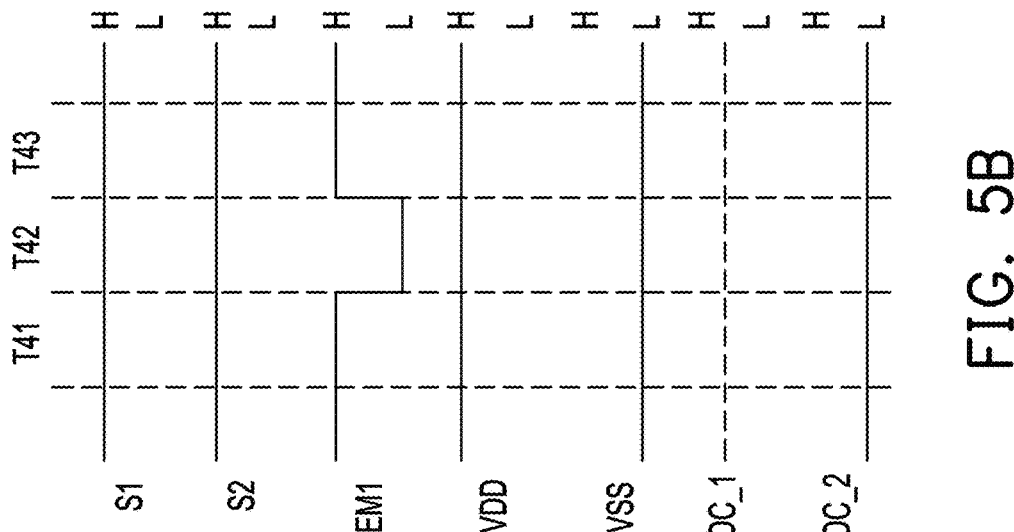
FIG. 5A is a circuit operation schematic diagram of a fourth test operation of the pixel circuit according to an embodiment of the disclosure.
FIG. 5B is a timing diagram of the fourth test operation of the pixel circuit according to an embodiment of the disclosure.

FIG. 5A is a circuit operation schematic diagram of a fourth test operation of the pixel circuit according to an embodiment of the disclosure. FIG. 5B is a timing diagram of the fourth test operation of the pixel circuit according to an embodiment of the disclosure. Referring to FIG. 1, FIG. 5A, and FIG. 5B, in this embodiment, three time periods are roughly divided, namely, a time period T41 before the test, a time period T42 during the test, and a time period T43 after the test.

In the time period T41, the control signals S1, S2, the emission control signal EM1, and the system high voltage VDD are at the high voltage level H, the system low voltage VSS and the second reference voltage DC_2 are at the low voltage level L, and the first reference voltage DC_1 may be at any voltage level (such as the high voltage level H or the low voltage level L). At this time, the transistors T2 to T8 are in the off state, and the data signal Data is basically independent of the state of the pixel circuit 100.

In the time period T42, the control signals S1, S2 and the system high voltage VDD are at the high voltage level H, the emission control signal EM1, the system low voltage VSS, and the second reference voltage DC_2 are at the low voltage level L, and the first reference voltage DC_1 may be at any voltage level (such as the high voltage level H or the low voltage level L). At this time, the transistors T6 to T9 are in the on state, the transistor T2 to T5 are in the off state, and the transistor T1 is turned on in response to the high voltage level H of the system high voltage VDD, in which transistors T1 and T7 form a drive path PH4. Due to the transistors T2 and T5 being off, the data signal Data reflects the test result of the drive path PH4. The actions in the time period T43 are basically the same as the time period T41.

In summary, in the pixel circuit of the embodiments of the disclosure, compared with the conventional pixel circuit, when the micro light emitting diode is not configured, the pixel circuit may be divided into several different signal paths, and by setting the control signal, the emission control signal, the system high voltage, the system low voltage, the first reference voltage, and the second reference voltage, the test result may be reflected from the data signal in sequence. In this way, when it is necessary to increase the signals required by the panel, the transistors, the capacitor, and the connection points may be tested in groups. That is, the circuit area of the gate driver circuit region on the panel is not increased, and the normal operation of the transistor in the pixel circuit is not affected.

Although the disclosure has been disclosed above through embodiments, the embodiments are not intended to limit the disclosure. Persons with ordinary knowledge in the relevant technical field may make some changes and modifications without departing from the spirit and scope of the disclosure. Therefore, the protection scope of the disclosure shall be determined by the appended claims.

What is claimed is:

1. A pixel circuit, comprising:
a first connection point configured to connect an anode of a light emitting element;
a second connection point configured to connect a cathode of the light emitting element and coupled to a system low voltage;
a first transistor having a first terminal receiving a system high voltage, a control terminal, and a second terminal;
a second transistor having a first terminal, a control terminal receiving a first control signal, and a second terminal coupled to the second terminal of the first transistor;
a third transistor having a first terminal coupled to the control terminal of the first transistor, a control terminal receiving the first control signal, and a second terminal coupled to the first terminal of the second transistor;
a fourth transistor having a first terminal coupled to the first terminal of the second transistor, a control terminal receiving a second control signal, and a second terminal receiving a first reference voltage;
a fifth transistor having a first terminal providing a data signal, a control terminal receiving the first control signal, and a second terminal;
a sixth transistor having a first terminal coupled to the second terminal of the fifth transistor, a control terminal receiving an emission control signal, and a second terminal receiving the first reference voltage;
a first capacitor coupled between the second terminal of the fifth transistor and the control terminal of the first transistor;
a seventh transistor having a first terminal coupled to the second terminal of the first transistor, a control terminal receiving the emission control signal, and a second terminal coupled to the first connection point;
an eighth transistor having a first terminal coupled to the first connection point, a control terminal receiving the emission control signal, and a second terminal; and
a ninth transistor having a first terminal coupled to the second terminal of the eighth transistor, a control terminal receiving a second reference voltage, and a second terminal coupled to the first terminal of the fifth transistor;
wherein the first control signal, the second control signal, the emission control signal, the system high voltage, the system low voltage, the first reference voltage, and the second reference voltage are set to electrically test the first connection point, the second connection point, the first transistor, the second transistor, the third transistor, the fifth transistor, the sixth transistor, the seventh transistor, and the first capacitor.

2. The pixel circuit as claimed in claim 1, wherein the first transistor, the second transistor, the third transistor, the fourth transistor, the fifth transistor, the sixth transistor, the seventh transistor, the eighth transistor, and the ninth transistor are respectively P-type transistors.

3. The pixel circuit as claimed in claim 2, wherein in response to the second control signal being at a high voltage level, the first control signal being at a low voltage level, the emission control signal being at the low voltage level, the system high voltage being at the low voltage level, the system low voltage being at the low voltage level, the first reference voltage being at the high voltage level, and the second reference voltage being at the high voltage level, the fifth transistor and the sixth transistor form an input path, and the data signal reflects a test result of the input path.

4. The pixel circuit as claimed in claim 2, wherein in response to the second control signal being at a high voltage level, the first control signal being at a low voltage level, the emission control signal being at the high voltage level, the system high voltage being at the high voltage level, the system low voltage being at the low voltage level, the first transistor, the second transistor, the third transistor, the first capacitor, and the fifth transistor form a transistor compensation path, and the data signal reflects a test result of the transistor compensation path.

5. The pixel circuit as claimed in claim 2, wherein in response to the second control signal being at a high voltage level, the first control signal being at the high voltage level, the emission control signal being at a low voltage level, the system high voltage being at the low voltage level, the system low voltage being at the high voltage level, and the second reference voltage being at the low voltage level, the data signal reflects a test result of a contact test path formed by the first connection point and the second connection point.

6. The pixel circuit as claimed in claim 5, wherein in response to the second control signal being at the high voltage level, the first control signal being at the high voltage level, the emission control signal being at the low voltage level, the system high voltage being at the high voltage level, the system low voltage being at the low voltage level, and the second reference voltage being at the low voltage level, the first transistor and the seventh transistor form a drive path, and the data signal reflects a test result of the drive path.

7. The pixel circuit as claimed in claim 1, wherein the light emitting element is a micro light emitting diode.

8. The pixel circuit as claimed in claim 1, wherein each of the first connection point and the second connection point is an endpoint of wiring, a through-hole, or a solder joint.

9. A pixel circuit, comprising:
a first connection point configured to connect an anode of a light emitting element;
a second connection point configured to connect a cathode of the light emitting element and coupled to a system low voltage;
a first transistor having a first terminal receiving a system high voltage, a control terminal, and a second terminal;
a second transistor having a first terminal, a control terminal receiving a first control signal, and a second terminal coupled to the second terminal of the first transistor;
a third transistor having a first terminal coupled to the control terminal of the first transistor, a control terminal receiving the first control signal, and a second terminal coupled to the first terminal of the second transistor;
a fourth transistor having a first terminal coupled to the first terminal of the second transistor, a control terminal receiving a second control signal, and a second terminal receiving a first reference voltage;

a fifth transistor having a first terminal providing a data signal, a control terminal receiving the first control signal, and a second terminal;

a sixth transistor having a first terminal coupled to the second terminal of the fifth transistor, a control terminal receiving an emission control signal, and a second terminal receiving the first reference voltage;

a first capacitor coupled between the second terminal of the fifth transistor and the control terminal of the first transistor;

a seventh transistor having a first terminal coupled to the second terminal of the first transistor, a control terminal receiving the emission control signal, and a second terminal coupled to the first connection point;

an eighth transistor having a first terminal coupled to the first connection point, a control terminal receiving the emission control signal, and a second terminal; and a ninth transistor having a first terminal coupled to the second terminal of the eighth transistor, a control terminal receiving a second reference voltage, and a second terminal;

wherein the first control signal, the second control signal, the emission control signal, the system high voltage, the system low voltage, the first reference voltage, and the second reference voltage are set to electrically test the first connection point, the second connection point, the first transistor, the second transistor, the third transistor, the fifth transistor, the sixth transistor, the seventh transistor, and the first capacitor.

10. The pixel circuit as claimed in claim 9, wherein the first transistor, the second transistor, the third transistor, the fourth transistor, the fifth transistor, the sixth transistor, the seventh transistor, the eighth transistor, and the ninth transistor are respectively P-type transistors.

11. The pixel circuit as claimed in claim 10, wherein in response to the second control signal being at a high voltage level, the first control signal being at a low voltage level, the emission control signal being at the low voltage level, the system high voltage being at the low voltage level, the system low voltage being at the low voltage level, the first reference voltage being at the high voltage level, and the second reference voltage being at the high voltage level, the fifth transistor and the sixth transistor form an input path, and the data signal reflects a test result of the input path.

12. The pixel circuit as claimed in claim 10, wherein in response to the second control signal being at a high voltage level, the first control signal being at a low voltage level, the emission control signal being at the high voltage level, the system high voltage being at the high voltage level, and the system low voltage being at the low voltage level, the first transistor, the second transistor, the third transistor, the first capacitor, and the fifth transistor form a transistor compensation path, and the data signal reflects a test result of the transistor compensation path.

13. The pixel circuit as claimed in claim 10, wherein in response to the second control signal being at a high voltage level, the first control signal being at the high voltage level, the emission control signal being at a low voltage level, the system high voltage being at the low voltage level, the system low voltage being at the high voltage level, and the second reference voltage being at the low voltage level, the second end of the ninth transistor provides a test result of a contact test path formed by the first connection point and the second connection point.

14. The pixel circuit as claimed in claim 13, wherein in response to the second control signal being at the high voltage level, the first control signal being at the high voltage level, the emission control signal being at the low voltage level, the system high voltage being at the high voltage level, the system low voltage being at the low voltage level, and the second reference voltage being at the low voltage level, the first transistor and the seventh transistor form a drive path, and the second end of the ninth transistor provides a test result of the drive path.

15. The pixel circuit as claimed in claim 9, wherein the light emitting element is a micro light emitting diode.

* * * * *